US011987770B2

(12) United States Patent
Billiauw et al.

(10) Patent No.: US 11,987,770 B2
(45) Date of Patent: May 21, 2024

(54) LIQUID HAND DISHWASHING CLEANING COMPOSITION WITH REDUCED VISCOSENSITIVITY

(71) Applicant: The Procter & Gamble Company, Cincinnati, OH (US)

(72) Inventors: Jan Julien Marie-Louise Billiauw, Gentbrugge (BE); Karl Ghislain Braeckman, Gerpinnes (BE); Katrien Richarde Francoise Decraene, Ghent (BE); Bjorn Vanoverstraete, Melle (BE)

(73) Assignee: The Procter & Gamble Company, Cincinnati, OH (US)

( * ) Notice: Subject to any disclaimer, the term of this patent is extended or adjusted under 35 U.S.C. 154(b) by 205 days.

(21) Appl. No.: 17/477,568

(22) Filed: Sep. 17, 2021

(65) Prior Publication Data

US 2022/0081644 A1 Mar. 17, 2022

(30) Foreign Application Priority Data

Sep. 17, 2020 (EP) .................................... 20196747
Jun. 17, 2021 (EP) .................................... 21180057

(51) Int. Cl.

| | |
|---|---|
| ***C11D 1/83*** | (2006.01) |
| ***C11D 1/40*** | (2006.01) |
| ***C11D 1/94*** | (2006.01) |
| ***C11D 17/08*** | (2006.01) |
| *C11D 1/14* | (2006.01) |
| *C11D 1/29* | (2006.01) |
| *C11D 1/66* | (2006.01) |
| *C11D 1/75* | (2006.01) |

(52) U.S. Cl.
CPC .................. *C11D 1/94* (2013.01); *C11D 1/40* (2013.01); *C11D 17/08* (2013.01); *C11D 1/146* (2013.01); *C11D 1/29* (2013.01); *C11D 1/662* (2013.01); *C11D 1/75* (2013.01); *C11D 2111/14* (2024.01)

(58) Field of Classification Search
CPC .. C11D 1/146; C11D 1/75; C11D 1/83; C11D 1/90; C11D 3/0094; C11D 11/0023; C11D 17/0091
See application file for complete search history.

(56) References Cited

U.S. PATENT DOCUMENTS

| | | | | |
|---|---|---|---|---|
| 5,238,609 | A | 8/1993 | Smith et al. | |
| 7,939,487 | B2 | 5/2011 | Scheuing et al. | |
| 8,114,826 | B1 | 2/2012 | Hermanson et al. | |
| 11,447,721 | B2 | 9/2022 | Billiauw et al. | |
| 11,530,370 | B2 | 12/2022 | Billiauw et al. | |
| 2002/0028976 | A1* | 3/2002 | Connor | C11D 1/02 568/909 |
| 2009/0036345 | A1* | 2/2009 | Kulbick | C11D 1/83 510/235 |
| 2011/0152158 | A1* | 6/2011 | Bettiol | C11D 3/0084 510/237 |
| 2012/0071379 | A1* | 3/2012 | Gonzales | C11D 17/0013 510/218 |
| 2012/0071380 | A1* | 3/2012 | Gonzales | C11D 3/382 510/343 |
| 2013/0072414 | A1* | 3/2013 | Price | C11D 1/86 510/447 |
| 2013/0072416 | A1 | 3/2013 | Price et al. | |
| 2017/0022458 | A1* | 1/2017 | Trujillo | B01J 13/06 |
| 2017/0044466 | A1 | 2/2017 | Van Buskirk et al. | |
| 2017/0137745 | A1 | 5/2017 | Tang | |
| 2018/0303090 | A1* | 10/2018 | Budhian | A61K 31/194 |
| 2020/0181532 | A1* | 6/2020 | Renmans | C11D 1/008 |
| 2021/0395643 | A1 | 12/2021 | Biiliauw et al. | |

FOREIGN PATENT DOCUMENTS

| | | | |
|---|---|---|---|
| DE | 102006017311 | A1 | 10/2007 |
| DE | 102016114673 | A1 | 2/2018 |
| EP | 0466243 | A1 | 1/1992 |
| EP | 2264136 | A1 | 12/2010 |
| EP | 2336282 | A1 | 6/2011 |
| EP | 3456805 | A1 | 3/2019 |
| EP | 3633016 | A1 | 4/2020 |
| JP | H11507956 | A | 7/1999 |
| JP | H11302683 | A | 11/1999 |
| JP | 2001520269 | A | 10/2001 |
| JP | 2002226891 | A | 8/2002 |
| JP | 2002294298 | A | 10/2002 |
| JP | 2004051958 | A | 2/2004 |
| JP | 2005171129 | A | 6/2005 |
| JP | 2005171131 | A | 6/2005 |

(Continued)

OTHER PUBLICATIONS

All Office Actions; U.S. Appl. No. 17/477,566, filed Sep. 17, 2021.
All Office Actions; U.S. Appl. No. 17/477,570, filed Sep. 17, 2021.
All Office Actions; U.S. Appl. No. 17/477,571, filed Sep. 17, 2021.
All Office Actions; U.S. Appl. No. 17/477,572, filed Sep. 17, 2021.
All Office Actions; U.S. Appl. No. 17/477,575, filed Sep. 17, 2021.
All Office Actions; U.S. Appl. No. 17/477,581, filed Sep. 17, 2021.
All Office Actions; U.S. Appl. No. 17/477,582, filed Sep. 17, 2021.
Extended European Search Report and Search Opinion; Application No. 20196747.8; dated Mar. 1, 2021; 7 pages.

(Continued)

*Primary Examiner* — Charles I Boyer
(74) *Attorney, Agent, or Firm* — Carolyn S. Powell

(57) ABSTRACT

The need for a hand-dishwashing composition which is highly effective at removing grease, providing long-lasting suds under soiled conditions, while having a Newtonian viscosity which is less sensitive to changes on surfactant and solvent levels, is met by formulating the liquid hand dishwashing cleaning composition to comprise a surfactant system having a combination of alkyl sulphate anionic surfactant having little or no alkoxylation and an alkyl polyglucoside surfactant.

20 Claims, No Drawings

(56) References Cited

FOREIGN PATENT DOCUMENTS

| | | | | |
|---|---|---|---|---|
| JP | 2007016131 | A | | 1/2007 |
| JP | 2009144023 | A | | 7/2009 |
| JP | 2013082846 | A | | 5/2013 |
| JP | 2013082847 | A | | 5/2013 |
| JP | 2014196514 | A | | 10/2014 |
| JP | 2015500890 | A | | 1/2015 |
| JP | 2016503124 | A | | 2/2016 |
| JP | 2017078098 | A | | 4/2017 |
| JP | 2017110215 | A | | 6/2017 |
| JP | 2017515947 | A | | 6/2017 |
| JP | 2018517820 | A | | 7/2018 |
| JP | 2020059843 | A | | 4/2020 |
| JP | 2020196810 | A | | 12/2020 |
| WO | 9416042 | A1 | | 7/1994 |
| WO | 9739088 | A1 | | 10/1997 |
| WO | 9800488 | A1 | | 1/1998 |
| WO | 9919448 | A1 | | 4/1999 |
| WO | 9919449 | A1 | | 4/1999 |
| WO | 0042155 | A1 | | 7/2000 |
| WO | 0077142 | A1 | | 12/2000 |
| WO | 2009143091 | A1 | | 11/2009 |
| WO | 2010027608 | A2 | | 3/2010 |
| WO | 2017079960 | A1 | | 5/2017 |
| WO | 2017097913 | | * | 6/2017 |
| WO | 2017097913 | A1 | | 6/2017 |

OTHER PUBLICATIONS

Sasol's Alcohol Portfolio Synthetic and Natural Alcohols, Sasol, Retrieved from the Internet: URL:http://sasolnorthamerica.com/Images/Interior/productsearchdocuments/sasolalcoholportfoliotechbulletin.pdf, Aug. 15, 2013, pp. 1-2.

U.S. Appl. No. 17/477,566, filed Sep. 17, 2021, to first inventor et al.

U.S. Appl. No. 17/477,570, filed Sep. 17, 2021, to first inventor et al.

U.S. Appl. No. 17/477,571, filed Sep. 17, 2021, to first inventor et al.

U.S. Appl. No. 17/477,572, filed Sep. 17, 2021, to first inventor et al.

U.S. Appl. No. 17/477,575, filed Sep. 17, 2021, to first inventor et al.

U.S. Appl. No. 17/477,581, filed Sep. 17, 2021, to first inventor et al.

U.S. Appl. No. 17/477,582, filed Sep. 17, 2021, to first inventor et al.

Extended European Search Report and Search Opinion; Application No. 21180057.8; dated Nov. 24, 2021, 9 pages.

Extended European Search Report and Search Opinion; Application No. 21180070.1; dated Nov. 24, 2021, 10 pages.

"Polypropylene Glycol 1000", ThermoFisher Scientific, Safety Data Sheet, Feb. 14, 2010, Revision No. 2, pp. 1-6.

* cited by examiner

LIQUID HAND DISHWASHING CLEANING COMPOSITION WITH REDUCED VISCOSENSITIVITY

FIELD OF THE INVENTION

The present invention relates to a liquid hand dishwashing cleaning composition.

BACKGROUND OF THE INVENTION

Hand-dishwashing cleaning compositions are formulated to be highly effective at removing grease from soiled dishes, while sustaining a rich foaming profile during the washing process. Moreover, a high viscosity is desired since it also connotes "richness" of the detergent composition. Hand dishwashing compositions comprising alkyl sulfate anionic surfactant having a low degree of alkoxylation, or even no alkoxylation, provide a more favourable grease cleaning performance compared to similar detergent compositions comprising alkoxylated alkyl sulfate anionic surfactant. However, this is usually at the expense of a reduced suds mileage in the presence of greasy soils.

Whether first added to a sink full of water or added directly to the dish to be washed or to a cleaning implement, the user expects a consistent usage and product performance experience during manual dishwashing. This includes the viscosity of the product as it directly impacts the user dosing experience, e.g. a low viscous product will flow faster out of the detergent container than a high viscous product will. As such, in order to provide a more consistent user experience, a Newtonian viscosity profile is desired. For products having a Newtonian viscosity, a more constant liquid flow out of the bottle is achieved even as the pressure applied to the bottle varies. It is also often desirable to alter the composition of the detergent composition such as vary the amount of surfactant or solvent present in order to adjust the cleaning performance or sudsing profile. However, such changes typically also result in a change in viscosity against which formulators need to re-adjust the overall formulation to bring back the viscosity to target.

Hence, a need remains for a hand-dishwashing composition which is highly effective at removing grease, providing long-lasting suds under soiled conditions, while having a Newtonian viscosity which is less sensitive to changes on surfactant and solvent levels.

WO2019006227A1 relates to a hand dishwashing cleaning composition which comprises a surfactant system having an alkyl polyglucoside surfactant, the alkyl polyglucoside surfactant component allows for a good dissolution profile of the composition during both manual dishwashing conditions with detergents dosed into a full sink or detergents directly dosed onto a sponge and washed under the tap. WO2019006229A1 relates to a hand dishwashing cleaning composition including a desirable foam rheology profile, the composition includes a surfactant system comprising an alkyl polyglucoside surfactant having a mixture of: 60% or more of a first alkyl polyglucoside surfactant material having an average carbon chain length between 10 and 12; and 40% or less of a second alkyl polyglucoside surfactant material having an average alkyl carbon chain length between 12 and 16. EP application EP20191842 (filed 20 Aug. 2020) relates to a spray dispenser and a cleaning composition, which provides improved polymeric grease cleaning and suds mileage, and hence reduced time to clean the dishes, the cleaning product comprises a spray dispenser and a cleaning composition, the composition is housed in the spray dispenser and the cleaning composition comprises anionic surfactant and alkyl polyglucoside surfactant. EP application EP19216769 (filed 17 Dec. 2019) relates to a cleaning product comprising a spray dispenser and a cleaning composition, which provides improved crystalline grease cleaning and good initial sudsing, and hence reduced time to clean the dishes, the cleaning product comprises a spray dispenser and a cleaning composition, the composition is housed in the spray dispenser and wherein the cleaning composition comprises alkyl polyglucoside surfactant, a co-surfactant selected from amphoteric surfactant, zwitterionic surfactant and mixtures thereof, and an organic solvent. EP0466243A1 relates to a process for preparing secondary alkyl sulfate-containing surface active compositions substantially free of unreacted organic matter and water. EP3374486A1 relates to cleaning compositions with improved sudsing profiles, which contain one or more branched and unalkoxylated C6-C14 alkyl sulfate anionic surfactants in combination with one or more linear or branched C4-C11 alkyl or aryl alkoxylated alcohol nonionic surfactants, such cleaning compositions are particularly suitable for use in hand-washing fabrics. WO2017079960A1 relates to cleaning compositions with improved sudsing profiles, which contain the combination of one or more branched, unethoxylated C6-C14 alkyl sulfate surfactants with one or more linear, unalkoxylated C6-C18 alkyl sulfate surfactants, such cleaning compositions are particularly suitable for hand-washing dishes or fabrics. WO2009143091A1 relates to a light duty liquid detergent composition that includes a C14-C15 alcohol and alcohol ethoxylate sulfate surfactant blend as an efficient and effective foaming agent, the surfactant-based product may be a hand dishwashing liquid, a liquid skin cleanser or any type of cleaning or cleansing product based on surfactants, the light duty liquid detergent composition includes an anionic sulfonate surfactant, an amine oxide, a C14-C15 alcohol sulfate, and a C14-C15 alcohol ethoxylate sulfate. WO2017097913A1 relates to a dishwashing detergent composition, including an alkyl sulfate having a branched chain, wherein the refractive index of the dishwashing detergent composition is 0.10 or more to 0.30 or less; the viscosity of the dishwashing detergent composition is 800 mPa·s or more to 1800 mPa·s or less; and the dishwashing detergent composition includes the alkyl sulfate in a content of 0.1% by mass or more to 4.0% by mass or less, based on the total amount of the dishwashing detergent composition. U.S. Pat. No. 7,939,487B2 and WO2010027608A2 relate to cleaning compositions with a limited number of natural ingredients containing an anionic surfactant, a hydrophilic syndetic, nonionic surfactant and a hydrophobic syndetic, the cleaning composition can be used to clean laundry, soft surfaces, and hard surfaces and cleans as well or better than commercial compositions containing synthetically derived cleaning agents.

SUMMARY OF THE INVENTION

The present invention relates to a liquid hand dishwashing cleaning composition comprising from 5% to 50% by weight of the total composition of a surfactant system, wherein the surfactant system comprises at least 40% by weight of the surfactant system of anionic surfactant, wherein the anionic surfactant comprises at least 50% by weight of the anionic surfactant of alkyl sulfate anionic surfactant, wherein the alkyl sulfate anionic surfactant has an alkyl chain comprising an average of from 8 to 18 carbon atoms; comprises branched alkyl sulfate anionic surfactant such that the alkyl sulfate anionic surfactant has an average degree of branching of at least 15%; and has an average degree of alkoxylation of less than 0.5; and an alkyl polyglucoside surfactant.

DETAILED DESCRIPTION OF THE INVENTION

It has been found that formulating a hand dishwashing composition which is highly effective at removing grease, provides long-lasting suds under soiled conditions, while also having a Newtonian viscosity which is less sensitive to changes on surfactant and solvent levels, can be provided by formulating the liquid hand dishwashing cleaning composition to comprise a surfactant system having a combination of alkyl sulphate anionic surfactant having little or no alkoxylation and an alkyl polyglucoside surfactant.

Definitions

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high suds volume and/or sustained suds volume, particularly during a substantial portion of or for the entire manual dishwashing process. This is important as the consumer uses high suds as an indicator that sufficient cleaning composition has been dosed. Moreover, the consumer also uses the sustained suds volume as an indicator that sufficient active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Cleaning Composition

The cleaning composition is a hand dishwashing cleaning composition in liquid form. The cleaning composition is preferably an aqueous cleaning composition. As such, the composition can comprise from 50% to 85%, preferably from 50% to 75%, by weight of the total composition of water.

The pH of the composition can be from 3.0 to 14, preferably from 6.0 to 12, more preferably from 8.0 to 10, as measured at 10% dilution in distilled water at 20° C. The pH of the composition can be adjusted using pH modifying ingredients known in the art.

The composition of the present invention can be Newtonian or non-Newtonian, preferably Newtonian. Preferably, the composition has a viscosity of from 50 mPa·s to 5,000 mPa·s, more preferably from 300 mPa·s to 2,000 mPa·s, or most preferably from 500 mPa·s to 1,500 mPa·s, alternatively combinations thereof. The viscosity is measured at 20° C. with a Brookfield RT Viscometer using spindle 31 with the RPM of the viscometer adjusted to achieve a torque of between 40% and 60%.

Surfactant System

The cleaning composition comprises from 5 to 50%, preferably from 8% to 45%, more preferably from 15% to 40%, by weight of the total composition of a surfactant system. The surfactant system comprises at least 40% by weight of the surfactant system of anionic surfactant, wherein the anionic surfactant comprises at least 50% by weight of the anionic surfactant of alkyl sulfate anionic surfactant having an alkyl chain comprising an average of from 8 to 18 carbon atoms and has an average degree of alkoxylation of less than 0.5, in addition to an alkyl polyglucoside surfactant.

Anionic Surfactant

For improved sudsing, the surfactant system comprises at least 40%, preferably from 45% to 90%, more preferably from 50 to 80% by weight of the surfactant system of the anionic surfactant. The anionic surfactant comprises at least 50%, preferably at least 70%, more preferably at least 90% by weight of the anionic surfactant of alkyl sulfate anionic surfactant. Most preferably, the anionic surfactant consists of alkyl sulfate surfactant, most preferably primary alkyl sulfate anionic surfactant. As such, while the surfactant system may comprise small amounts of further anionic surfactant, including sulfonates such as HLAS, or sulfosuccinate anionic surfactants, the surfactant system preferably comprises no further anionic surfactant beyond the alkyl sulfate anionic surfactant.

The alkyl sulfate anionic surfactant has an alkyl chain comprising an average of from 8 to 18 carbon atoms, preferably from 10 to 14 carbon atoms, more preferably from 12 to 13 carbon atoms.

The alkyl chain of the alkyl sulfated anionic surfactant preferably has a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 50/50, preferably from 60/40 to 80/20, most preferably from 60/40 to 70/30, while not compromising suds mileage in the presence of particulate soils.

The alkyl sulfate anionic surfactant comprises branched alkyl sulfate anionic surfactant such that the alkyl sulfate anionic surfactant has an average degree of branching of at least 15%, preferably from 15% to 50%, more preferably from 20% to 40%. As such, the alkyl sulfate anionic surfactant can comprise a mixture of linear and branched alkyl sulfate anionic surfactant.

The level of branching in the branched alkyl sulfate or alkyl alkoxy sulfate used in the detergent composition is calculated on a molecular basis. Commercially available alkyl sulfate anionic surfactant blends that are sold as "branched" will typically comprise a blend of linear alkyl sulfate as well as branched alkyl sulfate molecules. Commercially available alkyl alkoxy sulfate anionic surfactant blends that are sold as "branched" will typically comprise a blend of linear alkyl sulfate, branched alkyl sulfate, as well as linear alkyl alkoxy sulfate and branched alkyl alkoxy sulfate molecules. The actual calculation of the degree of branching is done based on the starting alcohol (and alkoxylated alcohols for alkyl alkoxy sulfate blends), rather than on the final sulfated materials, as explained in the weight average degree of branching calculation below:

The weight average degree of branching for an anionic surfactant mixture can be calculated using the following formula:

$$\text{Weight average degree of branching (\%)}=[(x1*\text{wt \% branched alcohol 1 in alcohol 1}+x2*\text{wt \% branched alcohol 2 in alcohol 2}+\ldots)/(x1+x2+\ldots)]*100$$

wherein x1, x2, . . . are the weight in grams of each alcohol in the total alcohol mixture of the alcohols which were used as starting material before (alkoxylation and) sulphation to produce the alkyl (alkoxy) sulfate anionic surfactant. In the weight average degree of branching calculation, the weight of the alkyl alcohol used to form the alkyl sulfate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulfate anionic surfactant.

The branched alkyl sulfate anionic surfactant comprises C2-branched alkyl sulfate anionic surfactant and non-C2-branched alkyl sulfate anionic surfactant. The weight ratio of non-C2-branched alkyl sulfate anionic surfactant to C2-branched alkyl sulfate anionic surfactant is greater than 0.5, preferably from 1.0:1 to 5:1, more preferably from 2:1 to 4:1.

C2-branched means the alkyl branching is a single alkyl branching on the alkyl chain of the alkyl sulfate anionic surfactant and is positioned on the C2 position, as measured counting carbon atoms from the sulfate group for non-alkoxylated alkyl sulfate anionic surfactants, or counting from the alkoxy-group furthest from the sulfate group for alkoxylated alkyl sulfate anionic surfactants.

Non-C2 branching means the alkyl chain comprises branching at multiple carbon positions along the alkyl chain backbone, or a single branching group present on a branching position on the alkyl chain other than the C2 position.

The non-C2 branched alkyl sulfate anionic surfactant can comprise less than 30%, preferably less than 20%, more preferably less than 10% by weight of the non-C2 branched alkyl sulfate anionic surfactant of C1-branched alkyl sulfate anionic surfactant, most preferably the non-C2 branched alkyl sulfate anionic surfactant is free of C1-branched alkyl sulfate anionic surfactant.

The non-C2 branched alkyl sulfate anionic surfactant can comprise at least 50%, preferably from 60 to 90%, more preferably from 70 to 80% by weight of the non-C2 branched alkyl sulfate anionic surfactant of isomers comprising a single branching at a branching position greater than the 2-position. That is, more than 2 carbons atoms away from the hydrophilic headgroup, as defined above. The non-C2 branched alkyl sulfate anionic surfactant can comprise from 5% to 30%, preferably from 7% to 20%, more preferably from 10% to 15% by weight of the non-C2 branched alkyl sulfate anionic surfactant of multi branched isomers. The non-C2 branched alkyl sulfate anionic surfactant can comprise from 5% to 30%, preferably from 7% to 20%, more preferably from 10% to 15% by weight of non-C2 branched alkyl sulfate anionic surfactant of cyclic isomers. If present, the acyclic branching groups can be selected from C1 to C5 alkyl groups, and mixtures thereof.

It has been found that formulating the compositions using alkyl sulfate anionic surfactants having the aforementioned branching distribution and little or no ethoxylation results in reduced viscosensitivity with variations in the starting alcohol used to make the alkyl sulfate surfactant, while also improving product stability, even at low temperatures, and ability to reach higher finished product viscosities, without compromising on suds mileage and grease cleaning.

Moreover, such compositions require less solvent in order to achieve good physical stability at low temperatures. As such, the compositions can comprise lower levels of organic solvent, of less than 5.0% by weight of the cleaning composition of organic solvent, while still having good low temperature stability. Higher surfactant branching also provides faster initial suds generation, but typically less suds mileage. The weight average branching, described herein, has been found to improve low temperature stability, initial foam generation and suds longevity.

The alkyl sulfate anionic surfactant has an average degree of alkoxylation of less than 0.5, preferably less than 0.25, more preferably less than 0.1, and most preferably, the alkyl sulfate anionic surfactant is free of alkoxylation. As such, the alkyl sulfate surfactant comprises less than 10% preferably less than 5% by weight of the alkyl sulfate anionic surfactant of an alkoxylated alkyl sulfate surfactant, more preferably wherein the alkyl sulfate anionic surfactant is free of an alkoxylated alkyl sulfate surfactant. If alkoxylated, the alkyl sulfated anionic surfactant is preferably ethoxylated.

The average degree of alkoxylation is the mol average degree of alkoxylation (i.e., mol average alkoxylation degree) of all the alkyl sulfate anionic surfactant. Hence, when calculating the mol average alkoxylation degree, the mols of non-alkoxylated sulfate anionic surfactant are included:

$$\text{Mol average alkoxylation degree}=(x1*\text{alkoxylation degree of surfactant 1}+x2*\text{alkoxylation degree of surfactant 2}+\ldots)/(x1+x2+\ldots)$$

wherein x1, x2, . . . are the number of moles of each alkyl (or alkoxy) sulfate anionic surfactant of the mixture and alkoxylation degree is the number of alkoxy groups in each alkyl sulfate anionic surfactant.

Detergent compositions comprising alkyl sulfate anionic surfactants having high degrees of ethoxylation have typically been more sensitive to changes in starting alcohol type used to produce the alkyl ethoxy sulfate anionic surfactant and to the type and level of solvents used in the formulation, resulting in large changes in the finished product viscosity. As such, it is often more difficult to reformulate compositions to take advantage of changes in raw material costs and/or supply availability, or in support of advertising claims around suds mileage or overall cleaning performance, while meeting the finished product viscosity requirements.

If ethoxylated alkyl sulfate is present, without wishing to be bound by theory, through tight control of processing conditions and feedstock material compositions, both during alkoxylation especially ethoxylation and sulfation steps, the amount of 1,4-dioxane by-product within alkoxylated especially ethoxylated alkyl sulfates can be reduced. Based on recent advances in technology, a further reduction of 1,4-dioxane by-product can be achieved by subsequent stripping, distillation, evaporation, centrifugation, microwave irradiation, molecular sieving or catalytic or enzymatic degradation steps. Processes to control 1,4-dioxane content within alkoxylated/ethoxylated alkyl sulfates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl)-phenyl]-2-(1-H)-pyridone, 3-α-hydroxy-7-oxo stereoisomer-mixtures of cholinic acid, 3-(N-methyl amino)-L-alanine, and mixtures thereof. Suitable counterions for the anionic surfactant include alkali metal cation earth alkali metal cation, alkanolammonium or ammonium or substituted ammonium, but preferably sodium.

Such Fischer Tropsch alcohols as non-C2 branched alkyl sources can be complemented with OXO-process derived alcohols such as Neodol, Lial or Isalchem alcohols as C2-branched alkyl sources and/or natural mid cut fractionated alcohols to achieve the desired alkyl sulfate anionic surfactant of use in the present to the invention. Alternative C2-branched alkyl sources than or in addition to OXO-process derived alcohols are those described in applications U.S. 63/035,125 and U.S. 63/035,131. Suitable alcohol blends for alkyl sulfate anionic surfactants according to the invention include (% by weight of total alcohol blend): 50% Safol 23A, 30% Neodol 3, 20% mid-cut fractionated natural alcohol; 50% Safol 23A, 30% Neodol 3, 20% C13 alcohol as disclosed in applications U.S. 63/035,125 and U.S. 63/035,131; and 30% Safol 23A, 30% Neodol 3, 20% mid-cut fractionated natural alcohol and 20% C13 alcohol as disclosed in applications U.S. 63/035,125 and U.S. 63/035,131. Preferred mid-cut fractionated natural alcohols within these such blends are palm kernel derived alcohols. These preferred palm kernel derived mid-cut fractionated natural alcohols typically comprise about 65% C12, 29% C14 and 6% C16 alcohols by weight of the palm kernel derived mid-cut fractionated natural alcohol. Alternative suitable mid-cut fractionated alcohols are coconut derived mid-cut fractionated alcohols which have a similar alkyl chain distribution within the mid-cut fractionated alcohol to the palm kernel derived mid-cut fractionated alcohol.

Alkyl Polyglucoside Surfactant

The surfactant system can comprise the alkyl polyglucoside surfactant at a level of from 1% to 10%, preferably from 2% to 8%, more preferably from 3% to 7%, by weight of the detergent composition. Alkyl polyglucoside nonionic surfactants are typically more sudsing than other nonionic surfactants such as alkyl ethoxlated alcohols.

A combination of alkylpolyglucoside and alkyl sulfate anionic surfactant has been found to improved polymerized grease removal, suds mileage performance, reduced viscosity variation with changes in the surfactant and/or system, and a more sustained Newtonian rheology.

The alkyl polyglucoside surfactant can be selected from C6-C18 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms.

Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability.

The anionic surfactant and alkyl polyglucoside surfactant can be present at a weight ratio of from greater than 1:1 to 10:1, preferably from 1.5:1 to 5:1, more preferably from 2:1 to 4:1

C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation). Glucopon® 215UP is a preferred short chain APG surfactant. Glucopon® 600CSUP is a preferred mid to long chain APG surfactant.

In preferred compositions, the surfactant system can comprise an alkyl sulfate anionic surfactant having an average degree of branching of less than 10% and alkyl polyglucoside nonionic surfactant.

Co-Surfactant

In order to improve surfactant packing after dilution and hence improve suds mileage, the surfactant system can further comprise a co-surfactant.

Preferred co-surfactants are selected from the group consisting of an amphoteric surfactant, a zwitterionic surfactant, and mixtures thereof. The co-surfactant is preferably an amphoteric surfactant, more preferably an amine oxide surfactant.

The weight ratio of anionic surfactant to the co-surfactant can be from 1:1 to 8:1, preferably from 2:1 to 5:1, more preferably from 2.5:1 to 4:1.

The surfactant system can comprise from 0.1% to 20%, preferably from 0.5% to 15%, more preferably from 2% to 10% by weight of the cleaning composition of the co-surfactant. The surfactant system of the cleaning composition of the present invention can comprise from 10% to 40%, preferably from 15% to 35%, more preferably from 20% to 30%, by weight of the surfactant system of the co-surfactant.

The amine oxide surfactant can be linear or branched, though linear are preferred. Suitable linear amine oxides are typically water-soluble, and characterized by the formula R1-N(R2)(R3) O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred. Preferably, the alkyl chain of the alkyl dimethyl amine oxide is a linear alkyl chain, preferably a C12-C14 alkyl chain, more preferably a C12-C14 alkyl chain derived from coconut oil or palm kernel oil.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from 1 to 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from 10% to 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulphobetaine (INCI Sultaines) as well as the Phosphobetaine, and preferably meets formula (I):

$$R4[CO—X(CH_2)_n]_x—N^+(R^2)(R_3)—(CH_2)_m—[CH(OH)—CH_2]_y—Y^-$$

wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, SO3, OPO(OR5)O or P(O)(OR5)O, wherein R5 is H or a C1-4 alkyl residue.

Preferred betaines are the alkyl betaines of formula (IIa), the alkyl amido propyl betaine of formula (IIb), the sulphobetaines of formula (IIc) and the amido sulphobetaine of formula (IId):

$$R^1—N^+(CH_3)_2—CH_2COO^- \quad (IIa)$$

$$R^1—CO—NH—(CH_2)_3—N^+(CH_3)_2—CH_2COO^- \quad (IIb)$$

$$R^1—N^+(CH_3)_2—CH_2CH(OH)CH_2SO_3^- \quad (IIc)$$

$$R^1—CO—NH—(CH_2)_3—N^+(CH_3)_2—CH_2CH(OH)CH_2SO_3^- \quad (IId)$$

in which R1 has the same meaning as in formula (I). Particularly preferred are the carbobetaines [i.e. wherein $Y^-$=COO— in formula (I)] of formulae (IIa) and (IIb), more preferred are the alkylamidobetaine of formula (IIb).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

Further Nonionic Surfactant

The surfactant system can comprise a further nonionic surfactant, in addition to the alkyl polyglucoside surfactant. It is believed that the addition of the further nonionic surfactant reduces viscosensitivity towards variations in starting alcohol in the alkyl sulfate anionic surfactant, and improved the ability to reach the desired viscosity values as well as improving low temperature stability, suds mileage and grease cleaning, which means that less branching at positions greater than C2 is required in the alkyl sulfate surfactant. As such, the addition of the further nonionic surfactant enables more flexibility in the choice of starting alcohols of use to make the alkyl sulfate anionic surfactant of the present compositions.

The further nonionic surfactant is preferably selected from the group consisting of: alkoxylated alkyl alcohol, and mixtures thereof, more preferably the further nonionic surfactant is selected from ethoxylated alcohols.

The detergent composition can comprise the further nonionic surfactant at a level of less than 20%, preferably less than 15%, more preferably from 5% to 10% by weight of the surfactant system.

Suitable alkoxylated non-ionic surfactants can be linear or branched, primary or secondary alkyl alkoxylated non-ionic surfactants. The alkoxylated nonionic surfactant can comprise on average of from 8 to 18, preferably from 9 to 15, more preferably from 10 to 14 carbon atoms in its alkyl chain.

Alkyl ethoxylated non-ionic surfactant are preferred. Suitable alkyl ethoxylated non-ionic surfactants can comprise an average of from 5 to 12, preferably from 6 to 10, more preferably from 7 to 8, units of ethylene oxide per mole of alcohol. Such alkyl ethoxylated nonionic surfactants can be derived from synthetic alcohols, such as OXO-alcohols and Fisher Tropsh alcohols, or from naturally derived alcohols, or from mixtures thereof. Suitable examples of commercially available alkyl ethoxylate nonionic surfactants include, those derived from synthetic alcohols sold under the Neodol® brand-name by Shell, or the Lial®, Isalchem®, and Safol® brand-names by Sasol, or some of the natural alcohols produced by The Procter & Gamble Chemicals company.

Further Ingredients:

The composition can comprise further ingredients such as those selected from: amphiphilic alkoxylated polyalkyleneimines, cyclic polyamines, triblock copolymers, salts, hydrotropes, organic solvents, other adjunct ingredients such as those described herein, and mixtures thereof.

Amphiphilic alkoxylated polyalkyleneimine:

The composition of the present invention may further comprise from 0.05% to 2%, preferably from 0.07% to 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

A preferred amphiphilic alkoxylated polyethyleneimine polymer has the general structure of formula (I):

(I)

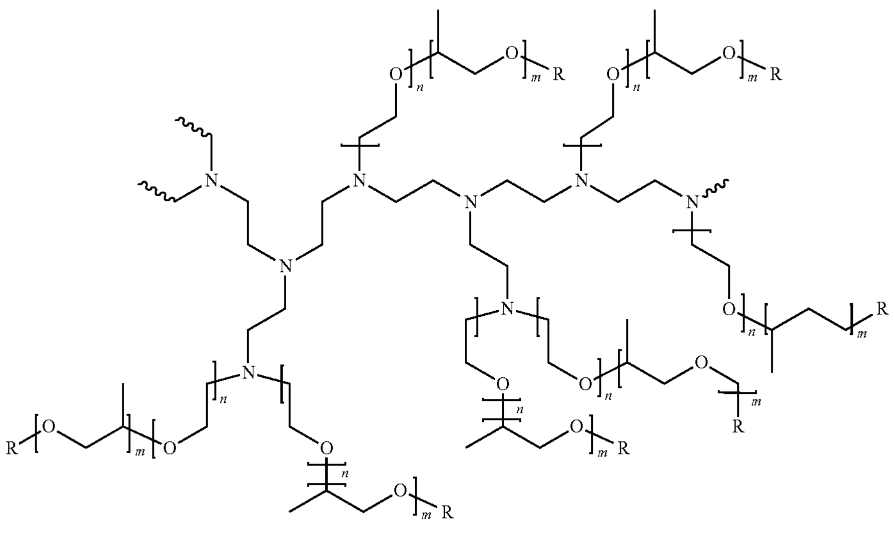

wherein the polyethyleneimine backbone has a weight average molecular weight of 600, n of formula (I) has an average of 10, m of formula (I) has an average of 7 and R of formula (I) is selected from hydrogen, a $C_1$-$C_4$ alkyl and mixtures thereof, preferably hydrogen. The degree of permanent quaternization of formula (I) may be from 0% to 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (I) but wherein the polyethyleneimine backbone has a weight average molecular weight of 600 Da, n of Formula (I) has an average of 24, m of Formula (I) has an average of 16 and R of Formula (I) is selected from hydrogen, a $C_1$-$C_4$ alkyl and mixtures thereof, preferably hydrogen. The degree of permanent quaternization of Formula (I) may be from 0% to 22% of the polyethyleneimine backbone nitrogen atoms and is preferably 0%. The molecular weight of this amphiphilic alkoxylated polyethyleneimine polymer preferably is between 25,000 and 30,000, most preferably 28,000 Da.

The amphiphilic alkoxylated polyethyleneimine polymers can be made by the methods described in more detail in PCT Publication No. WO 2007/135645.

Cyclic Polyamine

The composition can comprise a cyclic polyamine having amine functionalities that helps cleaning. The composition of the invention preferably comprises from 0.1% to 3%, more preferably from 0.2% to 2%, and especially from 0.5% to 1%, by weight of the composition, of the cyclic polyamine.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —$CH_3$ and the rest are H provided for improved grease cleaning performance.

Accordingly, the most preferred cyclic polyamine for use with the cleaning composition of the present invention are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Suitable cyclic polyamines can be supplied by BASF, under the Baxxodur tradename, with Baxxodur ECX-210 being particularly preferred.

A combination of the cyclic polyamine and magnesium sulphate is particularly preferred. As such, the composition can further comprise magnesium sulphate at a level of from 0.001% to 2.0%, preferably from 0.005% to 1.0%, more preferably from 0.01% to 0.5% by weight of the composition.

Triblock Copolymer

The composition of the invention can comprise a triblock copolymer. The triblock co-polymers can be present at a level of from 0.1% to 10%, preferably from 0.5% to 7.5%, more preferably from 1% to 5%, by weight of the total composition. Suitable triblock copolymers include alkylene oxide triblock co-polymers, defined as a triblock co-polymer having alkylene oxide moieties according to Formula (I): (EO)x(PO)y(EO)x, wherein EO represents ethylene oxide, and each x represents the number of EO units within the EO block. Each x can independently be on average of from 5 to 50, preferably from 10 to 40, more preferably from 10 to 30. Preferably x is the same for both EO blocks, wherein the "same" means that the x between the two EO blocks varies within a maximum 2 units, preferably within a maximum of 1 unit, more preferably both x's are the same number of units. PO represents propylene oxide, and y represents the number of PO units in the PO block. Each y can on average be from between 28 to 60, preferably from 30 to 55, more preferably from 30 to 48.

Preferably the triblock co-polymer has a ratio of y to each x of from 3:1 to 2:1. The triblock co-polymer preferably has a ratio of y to the average x of 2 EO blocks of from 3:1 to 2:1. Preferably the triblock co-polymer has an average weight percentage of total EO of between 30% and 50% by weight of the tri-block co-polymer. Preferably the triblock co-polymer has an average weight percentage of total PO of between 50% and 70% by weight of the triblock co-polymer. It is understood that the average total weight % of EO and PO for the triblock co-polymer adds up to 100%. The triblock co-polymer can have an average molecular weight of between 2060 and 7880, preferably between 2620 and 6710, more preferably between 2620 and 5430, most preferably between 2800 and 4700. Average molecular weight is determined using a 1H NMR spectroscopy (see Thermo scientific application note No. AN52907).

Triblock co-polymers have the basic structure ABA, wherein A and B are different homopolymeric and/or monomeric units. In this case A is ethylene oxide (EO) and B is propylene oxide (PO). Those skilled in the art will recognize the phrase "block copolymers" is synonymous with this definition of "block polymers".

Triblock co-polymers according to Formula (I) with the specific EO/PO/EO arrangement and respective homopolymeric lengths have been found to enhances suds mileage performance of the liquid hand dishwashing detergent composition in the presence of greasy soils and/or suds consistency throughout dilution in the wash process.

Suitable EO-PO-EO triblock co-polymers are commercially available from BASF such as Pluronic® PE series, and from the Dow Chemical Company such as Tergitol™ L series. Particularly preferred triblock co-polymer from BASF are sold under the tradenames Pluronic® PE6400 (MW ca 2900, ca 40 wt % EO) and Pluronic PE 9400 (MW ca 4600, 40 wt % EO). Particularly preferred triblock co-polymer from the Dow Chemical Company is sold under the tradename Tergitol™ L64 (MW ca 2700, ca 40 wt % EO).

Preferred triblock co-polymers are readily biodegradable under aerobic conditions.

The composition of the present invention may further comprise at least one active selected from the group consisting of: salt, hydrotrope, organic solvent, and mixtures thereof.

Salt:

The composition of the present invention may comprise from 0.05% to 2%, preferably from 0.1% to 1.5%, or more preferably from 0.5% to 1%, by weight of the total composition of a salt, preferably a monovalent or divalent inorganic salt, or a mixture thereof, more preferably selected from: sodium chloride, sodium sulfate, and mixtures thereof. Sodium chloride is most preferred.

Hydrotrope:

The composition of the present invention may comprise from 0.1% to 10%, or preferably from 0.5% to 10%, or more preferably from 1% to 10% by weight of the total composition of a hydrotrope or a mixture thereof, preferably sodium cumene sulfonate.

Organic Solvent:

The composition can comprise from 0.1% to 10%, or preferably from 0.5% to 10%, or more preferably from 1% to 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol (PPG), are the preferred glycol. The polypropyleneglycol can have a molecular weight of from 400 to 3000, preferably from 600 to 1500, more preferably from 700 to 1300. The polypropyleneglycol is preferably poly-1,2-propyleneglycol.

Adjunct Ingredients

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Method of Washing

The compositions of the present invention can be used in methods of manually washing dishware. Suitable methods can include the steps of delivering a composition of the present invention to a volume of water to form a wash solution and immersing the dishware in the solution. The dishware is cleaned with the composition in the presence of water.

Typically from 0.5 mL to 20 mL, preferably from 3 mL to 10 mL of the detergent composition, preferably in liquid form, can be added to the water to form the wash liquor. The actual amount of detergent composition used will be based on the judgment of the user, and will typically depend upon factors such as the particular product formulation of the detergent composition, including the concentration of active ingredients in the detergent composition, the number of soiled dishes to be cleaned, the degree of soiling on the dishes, and the like.

The detergent composition can be combined with from 2.0 L to 20 L, typically from 5.0 L to 15 L of water to form a wash liquor, such as in a sink. The soiled dishware is immersed in the wash liquor obtained, before scrubbing the soiled surface of the dishware with a cloth, sponge, or similar cleaning implement. The cloth, sponge, or similar cleaning implement is typically contacted with the dishware for a period of time ranged from 1 to 10 seconds, although the actual time will vary with each application and user preferences.

Optionally, the dishware can be subsequently rinsed. By "rinsing", it is meant herein contacting the dishware cleaned with the process according to the present invention with substantial quantities water. By "substantial quantities", it is meant usually from 1.0 to 20 L, or under running water.

Alternatively, the composition herein can be applied in its neat form to the dishware to be treated. By "in its neat form", it is meant herein that said composition is applied directly onto the surface to be treated, or onto a cleaning device or implement such as a brush, a sponge, a nonwoven material, or a woven material, without undergoing any significant dilution by the user (immediately) prior to application. "In its neat form", also includes slight dilutions, for instance, arising from the presence of water on the cleaning device, or the addition of water by the consumer to remove the remaining quantities of the composition from a bottle. Therefore, the composition in its neat form includes mixtures having the composition and water at ratios ranging from 50:50 to 100:0, preferably 70:30 to 100:0, more preferably 80:20 to 100:0, even more preferably 90:10 to 100:0 depending on the user habits and the cleaning task.

Such methods of neat application comprise the step of contacting the liquid hand dishwashing detergent composition in its neat form, with the dish. The composition may be poured directly onto the dish from its container. Alternatively, the composition may be applied first to a cleaning device or implement such as a brush, a sponge, a nonwoven material, or a woven material. The cleaning device or implement, and consequently the liquid dishwashing composition in its neat form, is then directly contacted to the surface of each of the soiled dishes, to remove said soiling. The cleaning device or implement is typically contacted with each dish surface for a period of time range from 1 to 10 seconds, although the actual time of application will depend upon factors such as the degree of soiling of the dish. The contacting of said cleaning device or implement to the dish surface is preferably accompanied by concurrent scrubbing Subsequently, the dishware can be rinsed, either by submersing in clean water or under running water.

Test Methods

The following assays set forth must be used in order that the invention described and claimed herein may be more fully understood.

Viscosity:

The viscosity is measured at 20° C. using a Brookfield RT Viscometer using spindle 31 with the RPM of the viscometer adjusted to achieve a torque of between 40% and 60%.

The viscosity profile upon shearing is measured at 20° C. using a Discovery HR-1 Hybrid Rheometer (TA Instruments) using a shear-rate sweep of from $0.10^{-1}$ to 1000 $s^{-1}$, after a 30 second zero-shear equilibration step.

Suds Mileage:

The objective of the Suds Mileage Index test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1. A defined amount of a test composition, depending on the targeted composition concentration (here: 0.12 wt %), is dispensed through a plastic pipette at a flow rate of 0.67 mL/sec at a height of 37 cm above the bottom surface of a sink (dimension: 300 mm diameter and 288 mm height) into a water stream (here: water hardness: 0.712, 2.49, 5.34 meq/1, water temperature: 42° C.) that is filling up the sink to 4 L with a constant pressure of 4 bar.

2. An initial suds volume generated (measured as average foam height×sink surface area and expressed in $cm^3$) is recorded immediately after end of filling.
3. A fixed amount (6 mL) of soil is immediately injected into the middle of the sink.
4. The resultant solution is mixed with a metal blade (10 cm×5 cm) positioned in the middle of the sink at the air liquid interface under an angle of 45 degrees rotating at 85 RPM for 20 revolutions.
5. Another measurement of the total suds volume is recorded immediately after end of blade rotation.
6. Steps 3-5 are repeated until the measured total suds volume reaches a minimum level of 400 $cm^3$. The amount of added soil that is needed to get to the 400 $cm^3$ level is considered as the suds mileage for the test composition.
7. Each test composition is tested 4 times per testing condition (i.e., water temperature, composition concentration, water hardness, soil type).
8. The average suds mileage is calculated as the average of the 4 replicates for each sample.
9. Calculate a Suds Mileage Index by comparing the average mileage of a test composition sample versus a reference composition sample. The calculation is as follows:

Suds Mileage Index=(average number of soil additions of test composition/average number of soil additions of reference composition)*100

The soil composition is produced through standard mixing of the components described in Table 1.

TABLE 1

| Particulate Soil | |
|---|---|
| Ingredient | Weight % |
| Zwan Flemish Carbonades | 22.67 |
| Beaten Eggs | 4.78 |
| Smash Instant Mash Potato | 9.26 |
| McDougall's Sponge Mix | 3.30 |
| Milk UHT Full Cream | 22.22 |
| Bisto Gravy Granules | 1.30 |
| Mazola ® Pure Corn Oil | 9.29 |
| Demineralized water | 26.32 |
| Sodium Benzoate | 0.42 |
| Potassium Sorbate | 0.42 |

Polymerized Grease Cleaning:

A soil composition comprising 75% of a blend of vegetable based cooking oils (by weight, ⅓ Wheat germ oil, ⅓ Sunflower oil and ⅓ Peanut oil, sourced from Vandenmoortel Belgium), 25% of Albumin powder from Chicken Egg, (White, Grade II, sourced from Sigma Chemicals) and 0.05% of Oil Red Dye (Lumogen F Rot 305, sourced from BASF) was prepared by homogeneously mixing the components at room temperature.

New tiles (8 cm by 25 cm stainless steel tiles, grade AISI 304, source from Lasertek, Belgium) were preconditioned by baking them at 135° C. for 2 hrs and subsequently cleaning them first with Dreft Original (Belgium) dishwashing liquid detergent followed by a cleaning step using ethanol. The preconditioning process was repeated 4 times.

0.6-0.7 g of the above soil composition was homogeneously applied using a paint roller made from synthetic sponge (7 cm length×6 cm diameter roller, for instance, as sourced from BRICO, HUBO, or GAMMA Belgium) to the stainless-steel tiles. The soiled tiles were subsequently baked for 2 h 45 minutes in an oven (for example, WTC Binder Type Series M240 or IP20) set at 135° C., followed by cooling for 24 h at a relative humidity of 70% and 25° C. (For instance, using a Climatic Control Cabinet—Type HC0033 or type VC0033, sourced from Heraus Votsch Belgium).

The tiles were placed on four cleaning tracks of a straight-line sheen machine tester (Wet Abrasion Scrub Tester Ref. 903PG/SA/B-Source: Sheen Instruments Limited).

New cellulosic sponges (Artikel Nr. 33100200 Materialnummer Z 1470000 Zuschnitt Schwamm, feinporig 90×40×40, sourced from MAPA GmbH, Bereich SPONTEX Industrie Germany), were preconditioned by boil washing in a washing machine in the absence of detergent 3 times. The sponges were pre-wetted with demineralised water at 20° C. and squeezed until no water drained from the sponge anymore, resulting in a sponge weight of 21 g+/−1 g). The sponges were cut to dimensions to fit the sponge holders of the straight-line sheen machine tester (9 cm×4 cm). 10 ml of a 20% weight test product solution in 2.5 meq/1 water at 20° C. was poured onto each sponge. Four sponges, each comprising a different test product solution, were placed under normal lab conditions (20° C., 40% rH) on the sponge holder of the sheen machine. A weight of 200 g was placed on top of the sponges and the sheen machine was set at a moving speed of 20 cycles/minute, with a stroke length of 35 cm to 40 cm. Progression of cleaning was visually assessed and the number of cycles needed to completely clean the tile was reported. The test result of 8 external replicates (i.e. 8 tiles, each product tested once on a tile) were averaged and reported as an index versus a reference product set at 100. A higher removal index represents improved grease cleaning efficacy. Testing products were rotated over the different sponge slots between external replicates in order to eliminate any bias from the testing tracks of the sheen tester.

EXAMPLE

The finished product rheology, visco-sensitivity upon active level increase, as well as polymerized grease cleaning and suds mileage performance in the presence of greasy or particulate soil was evaluated for compositions of the present invention and comparative compositions.

The following inventive and comparative liquid hand dishwashing detergent compositions were prepared by mixing together of the individual raw materials at room temperature using a batch type process.

Comparative examples A and B comprised non-alkoxylated linear alkyl sulfate anionic surfactant and alkyl polyglucoside nonionic surfactant, with example B comprising 25% more anionic surfactant and amphoteric surfactant.

Comparative example C comprised the same level of anionic surfactant and amphoteric surfactant as example A, but did not comprise alkyl polyglucoside nonionic surfactant, and a lower level of ethanol was added to ensure that comparative example C had a similar viscosity to that of example A. Example D comprised the same level of anionic surfactant and amphoteric surfactant as example B but did not comprise alkyl polyglucoside nonionic surfactant. Comparative example E was similar to comparative example C, but comprised an alkyl ethoxylated anionic surfactant (ethoxylation degree 0.6) instead of an alkyl sulfate anionic surfactant, and the ethanol level was adjusted to provide a viscosity that was similar to inventive example A and comparative example C. Comparative example F was similar to comparative example E, but comprised alkyl polyglucoside surfactant and the same level of ethanol as inventive examples A and B.

TABLE 2a

Comparative hand dishwashing detergent compositions (Ex A to Ex F):

| Wt % (as 100% active) | Ex A | Ex B | Ex C | Ex D | Ex E | Ex F |
|---|---|---|---|---|---|---|
| Sodium lauryl sulfate[1] | 15.84 | 19.9 | 15.84 | 19.9 | — | — |
| Sodium C12-C13 EO0.6 sulfate[2] | — | — | — | — | 15.84 | 15.84 |
| C12-C14 dimethyl Amine Oxide | 5.66 | 7.1 | 5.66 | 7.1 | 5.66 | 5.66 |
| C8-10 alkyl polyglucoside[3] | 3.75 | 3.75 | — | — | — | 3.75 |
| C10-16 alkyl polyglucoside[4] | 1.75 | 1.75 | — | — | — | 1.75 |
| Ethanol | 4.0 | 4.0 | 2.34 | 4.0 | 1.5 | 4.0 |
| Poly-1,2-propylene glycol (MW1000 g/mol)[5] | 1.1 | 1.1 | 1.1 | 1.1 | 1.1 | 1.1 |
| Perfume, dye, preservative | 2.16 | 2.16 | 2.16 | 2.16 | 2.16 | 2.16 |
| Water | to 100% | to 100% | to 100% | to 100% | to 100% | to 100% |
| pH (as 10% solution in demi water, trimmed with HCl) | 9.0 | 9.0 | 9.0 | 9.0 | 9.0 | 9.0 |

[1]Linear
[2]18% branched
[3]Glucopon 215UP, supplied by BASF
[4]Glucopon 600CSUP, supplied by BASF
[5]weight average molecular weight Inventive example 1 was similar to example A but comprised non-alkoxylated branched (30.4% branched) alkyl sulfate anionic surfactant, with the addition of 0.5% by weight of the composition of sodium chloride and a level of ethanol to provide a viscosity of about 1,400 cps. Inventive example 2 was similar to example 1 but comprised 25% more anionic surfactant and amphoteric surfactant.

Comparative examples G and H are the same as inventive examples 1 and 2 respectively, except that they did not comprise alkyl polyglucoside nonionic surfactant.

TABLE 2b

Hand dishwashing detergent compositions of the present invention (Ex 1 and Ex 2, and comparative examples (Ex G to Ex H):

| Wt % (as 100% active) | Ex 1 | Ex 2 | Ex G | Ex H |
|---|---|---|---|---|
| Sodium C12-C13 sulfate (branched)[6] | 15.84 | 19.9 | 15.84 | 19.9 |
| C12-C14 dimethyl Amine Oxide | 5.66 | 7.1 | 5.66 | 7.1 |
| C8-10 alkyl polyglucoside[2] | 3.75 | 3.75 | — | — |
| C10-16 alkyl polyglucoside[3] | 1.75 | 1.75 | — | — |
| NaCl | 0.5 | 0.5 | 0.5 | 0.5 |
| Ethanol | 2.0 | 2.0 | 1.0 | 1.0 |
| Poly-1,2-propylene glycol (MW1000 g/mol)[4] | 1.1 | 1.1 | 1.1 | 1.1 |
| Perfume, dye, preservative | 2.16 | 2.16 | 2.16 | 2.16 |
| Water | to 100% | to 100% | to 100% | to 100% |
| pH (as 10% solution in demi water, trimmed with HCl) | 9.0 | 9.0 | 9.0 | 9.0 |

[6]30.4% branched

The resultant viscosity, rheology profile (whether Newtonian or shear thinning), suds mileage in the presence of particulate soil, and efficacy in removing polymerized grease is shown below:

TABLE 3a

The resultant viscosity, rheology profile (whether Newtonian or shear thinning), suds mileage in the presence of particulate soil, and efficacy in removing polymerized grease for comparative examples A to F)

| | Ex A | Ex B | Ex C | Ex D | Ex E | Ex F |
|---|---|---|---|---|---|---|
| Sodium lauryl sulfate[1] | 15.84 | 19.9 | 15.84 | 19.9 | — | — |
| Sodium C12-C13 EO0.6 sulfate[2] | — | — | — | — | 15.84 | 15.84 |
| C12-C14 dimethyl Amine Oxide | 5.66 | 7.1 | 5.66 | 7.1 | 5.66 | 5.66 |
| C8-10 alkyl polyglucoside[2] | 3.75 | 3.75 | — | — | — | 3.75 |
| C10-16 alkyl polyglucoside[3] | 1.75 | 1.75 | — | — | — | 1.75 |
| Ethanol | 4.0 | 4.0 | 2.34 | 4.0 | 1.5 | 4.0 |
| Total surfactant | 27.0 | 32.5 | 21.5 | 27.0 | 21.5 | 27.0 |
| Viscosity (cps) | 765 | 1550 | 750 | 1870 | 405 | 432 |
| Rheology profile | | | | | | |
| Newtonian (N) or shear thinning (S) | N | N | N | S | N | S |
| Suds mileage (particulate soil) | | | | | | |
| 2 gpg | 100 | | 83 | | 75 | 80 |
| 7 gpg | 100 | | 86 | | 72 | 76 |
| 15 gpg | 100 | | 96 | | 82 | 86 |
| Polymerised grease cleaning | 100 | | 90 | | 35 | 39 |

Comparative example C differs from comparative example A by not comprising alkyl polyglucoside nonionic surfactant. In addition, the level of ethanol was reduced in order to increase the viscosity of the composition to that of example A.

From comparing the viscosities of example A and B with the viscosities of comparative examples C and D, the alkyl polyglucoside in the compositions of the present invention results in less viscosity variation with changes in surfactant level (viscosity change of 785 cps for the inventive compositions and 1120 cps for the comparative compositions). As such, less formulation effort (such as changing the levels of solvent, salt and other viscosity modifying agents) is needed in order to provide the same user experience as the formulation is changed. The viscosity difference without the presence of the alkyl polyglucoside would have been much greater if comparative example D comprised the same level of ethanol as in comparative example C, since ethanol reduces the composition viscosity.

Comparing example A with comparative example F, the combination of alkyl sulfate anionic surfactant comprising little or no alkoxylation with the alkyl polyglucoside nonionic surfactant results in a more Newtonian viscosity profile, as well as a higher viscosity compared to the similar formulation comprising alkyl ethoxy sulfate anionic surfactant. The more Newtonian viscosity and higher viscosity both lead to a more consistent and pleasant dispensing experience for the user.

By comparing the suds mileage from example A with that from comparative examples C, E, and F, it is clear that the combination of alkyl sulfate anionic surfactant comprising little or no alkoxylation and the alkyl polyglucoside nonionic surfactant results in a synergistic improvement in suds mileage across all water hardness, in the presence of particulate soil.

By comparing the polymerized grease cleaning from example A with that from comparative examples C, E, and F, it is clear that the combination of alkyl sulfate anionic surfactant comprising little or no alkoxylation and the alkyl polyglucoside nonionic surfactant also results in an improved in polymerized grease removal.

TABLE 3b

The resultant viscosity, rheology profile (whether Newtonian or shear thinning) for inventive compositions example 1 and example 2, and for comparative examples G and H):

| Wt % (as 100% active) | Ex 1 | Ex 2 | Ex G | Ex H |
|---|---|---|---|---|
| Sodium C12-C13 sulfate (branched)[6] | 15.84 | 19.9 | 15.84 | 19.9 |
| C12-C14 dimethyl Amine Oxide | 5.66 | 7.1 | 5.66 | 7.1 |
| C8-10 alkyl polyglucoside[2] | 3.75 | 3.75 | — | — |
| C10-16 alkyl polyglucoside[3] | 1.75 | 1.75 | — | — |
| NaCl | 0.5 | 0.5 | 0.5 | 0.5 |
| Ethanol | 2.0 | 2.0 | 1.0 | 1.0 |
| Total surfactant | 27.0 | 32.5 | 21.5 | 27.0 |
| Viscosity (cps) | 1405 | 1557 | 1380 | 2560 |

From the results of table 3b, it can be seen that the reduced visco-sensitivity upon active level change, from the combination of alkyl sulfate anionic surfactant comprising little or no alkoxylation and the alkyl polyglucoside nonionic surfactant, is also present when a branched alkyl sulfate anionic surfactant is used instead of a linear alkyl sulfate anionic surfactant.

By comparing the viscosity difference between inventive examples 1 and 2 (table 3b) versus the viscosity difference between comparative examples A and B (table 3a), it can be seen that the visco-sensitivity is further reduced when the composition comprises branched alkyl sulphate surfactant instead of linear alkyl sulphate surfactant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hand dishwashing cleaning composition comprising from about 5% to about 50% by weight of the total composition of a surfactant system, wherein the surfactant system comprises:

A) at least about 40% by weight of the surfactant system of anionic surfactant, wherein the anionic surfactant comprises at least about 50% by weight of the anionic surfactant of alkyl sulfate anionic surfactant, wherein the alkyl sulfate anionic surfactant:
   i. has an alkyl chain comprising an average of from 8 to 18 carbon atoms;
   ii. comprises branched alkyl sulfate anionic surfactant such that the alkyl sulfate anionic surfactant has an average degree of branching of at least about 15%; and
   iii. has an average degree of alkoxylation of less than about 0.5; and B) an alkyl polyglucoside surfactant, wherein the anionic surfactant and alkyl polyglucoside surfactant are present at a weight ratio of from greater than about 1:1 to about 10:1, wherein the alkyl polyglucoside surfactant is selected from C8-C18 APG, and is a blend of short chain alkyl polyglucoside surfactant having an alkyl chain comprising 10 carbon atoms or less, and long chain alkyl polyglucoside surfactant having an alkyl chain comprising greater than 10 carbon atoms, and wherein the alkyl polyglucoside surfactant has a number average degree of polymerization of from about 0.1 to about 3.0, and C) from about 10% to about 40% by weight of the surfactant system of a co-surfactant comprising amine oxide, betaine, or combinations thereof.

2. The composition according to claim 1, wherein the liquid hand dishwashing cleaning composition comprises from about 8% to about 45% by weight of the total composition of the surfactant system.

3. The composition according to claim 1, wherein the surfactant system comprises from about 45% to about 90% by weight of the surfactant system of the anionic surfactant.

4. The composition according to claim 1, wherein the alkyl sulfate anionic surfactant has an average degree of alkoxylation of less than about 0.25.

5. The composition according to claim 4, wherein the alkyl sulfate anionic surfactant is free of alkoxylation.

6. The composition according to claim 1, wherein the alkyl sulfate anionic surfactant has an alkyl chain comprising an average of from 12 to 13 carbon atoms.

7. The composition according to claim 1, wherein the anionic surfactant comprises at least about 70% by weight of the anionic surfactant of alkyl sulfate anionic surfactant.

8. The composition according to claim 1, wherein the anionic surfactant comprises at least about 90% by weight of the anionic surfactant of alkyl sulfate anionic surfactant.

9. The composition according to claim 1, wherein the alkyl sulfate anionic surfactant comprises branched alkyl sulfate anionic surfactant such that the alkyl sulfate anionic surfactant has an average degree of branching of from about 15% to about 50%.

10. The composition according to claim 9, wherein the branched alkyl sulfate anionic surfactant comprises C2-branched alkyl sulfate anionic surfactant and non-C2-branched alkyl sulfate anionic surfactant, wherein the weight ratio of non-C2-branched alkyl sulfate anionic surfactant to C2-branched alkyl sulfate anionic surfactant is greater than about 0.5.

11. The composition according to claim 10, wherein the branched alkyl sulfate anionic surfactant comprises C2-branched alkyl sulfate anionic surfactant and non-C2-branched alkyl sulfate anionic surfactant, wherein the weight ratio of non-C2-branched alkyl sulfate anionic surfactant to C2-branched alkyl sulfate anionic surfactant is from 2.0:1.0 to 4.0:1.0.

12. The cleaning product according to claim 1, wherein the alkyl polyglucoside surfactant is a blend of short chain alkyl polyglucoside surfactant having an alkyl chain comprising 10 carbon atoms or less and long chain alkyl polyglucoside surfactant having an alkyl chain comprising greater than 10 to 16 carbon atoms, wherein the weight ratio of short chain alkyl polyglucoside surfactant to long chain alkyl polyglucoside surfactant is from about 1:1 to about 10:1.

13. The cleaning product according to claim 12, wherein the alkyl polyglucoside surfactant is a blend of short chain alkyl polyglucoside surfactant having an alkyl chain comprising 10 carbon atoms or less and long chain alkyl polyglucoside surfactant having an alkyl chain comprising greater than 10 to 16 carbon atoms, wherein the weight ratio of short chain alkyl polyglucoside surfactant to long chain alkyl polyglucoside surfactant is from about 2:1 to about 4:1.

14. The composition according to claim 1, wherein the weight ratio of anionic surfactant to the co-surfactant is from about 1:1 to about 8:1.

15. The composition according to claim 14, wherein the weight ratio of anionic surfactant to the co-surfactant is from about 2.5:1 to about 4:1.

16. A liquid hand dishwashing cleaning composition comprising from about 5% to about 50% by weight of the total composition of a surfactant system, wherein the surfactant system comprises:

at least about 40% by weight of the surfactant system of anionic surfactant, wherein the anionic surfactant comprises at least about 50% by weight of the anionic surfactant of alkyl sulfate anionic surfactant, wherein the alkyl sulfate anionic surfactant:

i. has an alkyl chain comprising an average of from 8 to 18 carbon atoms;

ii. comprises branched alkyl sulfate anionic surfactant such that the alkyl sulfate anionic surfactant has an average degree of branching of at least about 15%; and iii. has an average degree of alkoxylation of less than about 0.5; and an alkyl polyglucoside surfactant, wherein the anionic surfactant and alkyl polyglucoside surfactant are present at a weight ratio of from greater than about 1:1 to about 10:1, and from about 10% to about 40% by weight of the surfactant system of a co-surfactant comprising amine oxide, wherein:

the composition has a viscosity of 800 to 1,800 mPa·s measured at 20° C. with a Brookfield RT Viscometer using spindle 31 with the RPM of the viscometer adjusted to achieve a torque of between 40% and 60%, the corn position exhibits reduced viscosensitivity, and the reduced viscosensitivity comprises a viscosity change of less than 785 mPa·s when the amine oxide is increased by less than 1.5 wt. % by weight of the composition and the anionic surfactant is increased by less than 4 wt. % by weight of the composition.

17. The composition according to claim 16, wherein the alkyl polyglucoside surfactant is selected from C8-C18 APG, wherein the alkyl polyglucoside surfactant is a blend of short chain alkyl polyglucoside surfactant having an alkyl chain comprising 10 carbon atoms or less, and long chain alkyl polyglucoside surfactant having an alkyl chain comprising greater than 10 carbon atoms, and wherein the alkyl polyglucoside surfactant has a number average degree of polymerization of from about 0.1 to about 3.0.

18. The composition according to claim 16, wherein the alkyl sulfate anionic surfactant has an average degree of alkoxylation of less than about 0.25.

19. The composition according to claim 16, wherein:

the alkyl sulfate anionic surfactant comprises branched alkyl sulfate anionic surfactant such that the alkyl sulfate anionic surfactant has an average degree of branching of from about 15% to about 50%;

the branched alkyl sulfate anionic surfactant comprises C2-branched alkyl sulfate anionic surfactant and non-C2-branched alkyl sulfate anionic surfactant, wherein the weight ratio of non-C2-branched alkyl sulfate anionic surfactant to C2-branched alkyl sulfate anionic surfactant is greater than about 0.5; and the branched alkyl sulfate anionic surfactant comprises C2-branched alkyl sulfate anionic surfactant and non-C2-branched alkyl sulfate anionic surfactant, wherein the weight ratio of non-C2-branched alkyl sulfate anionic surfactant to C2-branched alkyl sulfate anionic surfactant is from 2.0:1.0 to 4.0:1.0.

20. The composition according to claim 16, wherein the weight ratio of anionic surfactant to the co-surfactant is from about 1:1 to about 8:1.

* * * * *